(12) United States Patent
Maas

(10) Patent No.: US 6,606,186 B2
(45) Date of Patent: Aug. 12, 2003

(54) DYNAMIC FIBER OPTIC SENSOR SIGNAL PROCESSING SCHEME

(75) Inventor: Steven J. Maas, Austin, TX (US)

(73) Assignee: PGS Americas, Inc., Houston, TX (US)

( * ) Notice: Subject to any disclaimer, the term of this patent is extended or adjusted under 35 U.S.C. 154(b) by 124 days.

(21) Appl. No.: 09/915,084

(22) Filed: Jul. 25, 2001

(65) Prior Publication Data

US 2003/0021007 A1 Jan. 30, 2003

(51) Int. Cl.$^7$ ............................... G02F 2/00; G01V 1/28
(52) U.S. Cl. .................. 359/325; 181/112; 250/227.14; 356/72; 367/21; 385/12
(58) Field of Search ..................... 359/325; 385/12, 385/15, 16; 356/32, 72; 250/227.14–227.18; 181/108–112; 367/14, 21–24

(56) References Cited

U.S. PATENT DOCUMENTS

| 4,552,457 A | 11/1985 | Giallorenzi et al. ........ 356/345 |
| 4,752,132 A | 6/1988 | Pavlath ........................ 356/345 |
| 4,848,906 A | 7/1989 | Layton ........................ 356/345 |
| 4,860,279 A | 8/1989 | Falk et al. ...................... 370/1 |
| 4,882,775 A | 11/1989 | Coleman ..................... 455/617 |
| 5,397,891 A | 3/1995 | Udd et al. ............. 250/227.18 |
| 5,680,489 A | 10/1997 | Kersey ........................ 385/12 |
| 5,798,521 A | 8/1998 | Froggatt ................ 250/227.19 |
| 2003/0021007 A1 * | 1/2003 | Maas ......................... 359/325 |

* cited by examiner

Primary Examiner—John D. Lee
(74) Attorney, Agent, or Firm—E. Eugene Thigpen

(57) ABSTRACT

The claimed invention is an apparatus, method and system for optimizing bandwidth utilization of demodulators in a system for seismic signal processing, wherein the apparatus comprises demodulators having bandwidths, wherein one demodulator's bandwidth is greater than another demodulator's bandwidth. The apparatus further comprises an optical switch coupled to a fringe rate detector, wherein optical fibers bear seismic signals having fringe rates detected by the fringe rate detector. The optical signals are switched among the demodulators in dependence upon the fringe rates. Further, the claimed invention is an apparatus, method and system for active gain ranging of demodulated signal outputs.

41 Claims, 3 Drawing Sheets

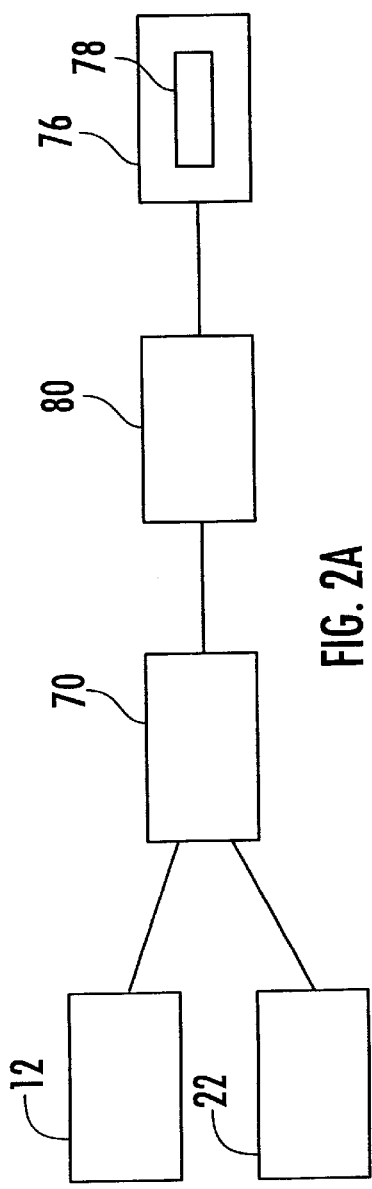
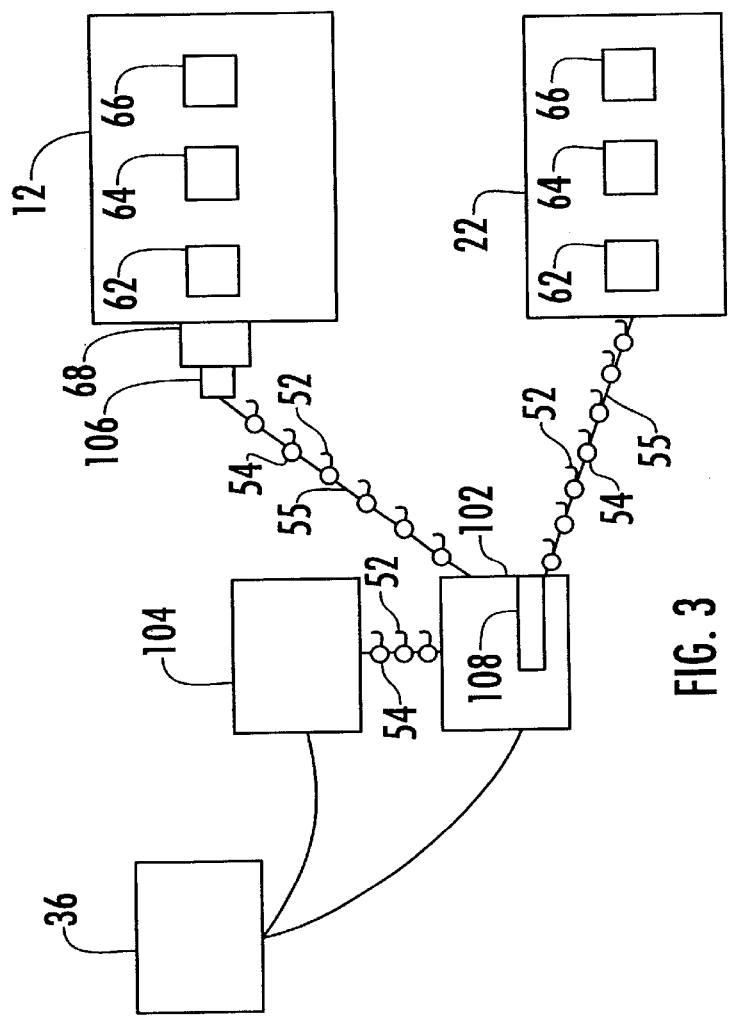

DYNAMIC FIBER OPTIC SENSOR SIGNAL PROCESSING SCHEME

BACKGROUND OF THE INVENTION

Fiber optic telemetry schemes are an economic approach to sensing seismic sensor arrays, which typically extend over long distances, sometimes several miles. In some seismic sensor systems, the optical sensor signals are outputs of interferometers, and are called fiber optic interferometric sensor systems. In such systems, demodulation electronics are used to process the signals. Processing the signals, however, is complicated by strain on the interferometer, which causes light propagating through the arms of the interferometer to cycle through fringes, the rate of such cycling commonly referred to as the "fringe rate."

Sensors in close proximity to the excitation energy source, like an acoustic source such as an air gun, generate high fringe rates compared to sensors that are far from the excitation energy source. The communication channels carrying signals from sensors located in the proximity of the excitation energy source are theoretically capable of carrying the multiplexed signals. The signal processors, for example demodulators, become overloaded and tend to drop some of the signals; under such circumstances signal information is lost. Therefore, the communication channels are designed for the close proximity loads, and the communication channels carrying signals from sensors located far from the excitation energy source are under-utilized. On the other hand, when the seismic sensors are located so far away from the excitation energy source the resulting signals are so weak that they become excessively attenuated over the communication channels that they cannot be recorded on the recording system and are thus lost. Therefore, there is a need for a more economic approach to processing high and low fringe rate signals without losing information and without requiring a large number of demodulators.

SUMMARY OF THE INVENTION

In view of the described problems in processing the seismic sensor interferometric signals, it is desirable to prevent signals from dropping out caused by overloading of some of the demodulators. In addition, it is desirable to optimally utilize the demodulators by routing signals to a high performance demodulator capable of processing signals having high fringe rates. Either of these needs, individually or both simultaneously, is achieved in various embodiments of the claimed invention by routing signals to a high performance demodulator only when necessary, i.e., on a need basis only, then fewer high performance demodulators are required to achieve optimum performance, and thereby cost less than traditional systems.

According to one aspect of the present invention, an apparatus is provided for optimizing bandwidth utilization of demodulators in a system for seismic signal processing, wherein the apparatus comprises a first demodulator having a first bandwidth and first optical demodulator inputs. The apparatus further comprises a second demodulator having second optical demodulator inputs and a second bandwidth, wherein the second bandwidth is greater than the first bandwidth. Still further, the apparatus comprises an optical switch having optical inputs coupled to optical fibers from seismic telemetry, optical outputs coupled to the first optical demodulator inputs and the second optical demodulator inputs, and a switch control input electronically coupled to a fringe rate detector output. The apparatus also comprises a fringe rate detector having a fringe rate detector input coupled to the optical fibers from seismic telemetry and a fringe rate detector output coupled to the switch control input. In addition, the optical fibers bear seismic optical signals having fringe rates; and, overall, the optical signals are switched among the demodulators in dependence upon the fringe rates.

According to another aspect of the invention, a method is provided of optimizing bandwidth utilization of demodulators in a system for seismic signal processing, wherein the method comprises routing optical signals to a first demodulator, sensing a fringe rate for each of the optical signals, and detecting a signal line having fringe rates exceeding a threshold fringe rate input for the first demodulator. The method further comprises rerouting the signal line to a second demodulator, detecting a condition of the signal line, and rerouting the signal line from the second demodulator back to the first demodulator when the signal line has fringe rates below the threshold fringe rate input for the first demodulator.

According to still another aspect of the invention, a system is provided of optimizing bandwidth utilization of demodulators in a system for seismic signal processing, wherein the system comprises a means for routing optical signals to a first demodulator, a means for sensing a fringe rate for each of the optical signals, and a means for detecting a signal line having fringe rates exceeding a threshold fringe rate input for the first demodulator. The system further comprises a means for rerouting the signal line to a second demodulator, a means for detecting a condition of the signal line, and a means for rerouting the signal line from the second demodulator back to the first demodulator when the signal line has fringe rates below the threshold fringe rate input for the first demodulator.

In still further aspects of the invention, an apparatus, method, and system are provided for routing the optical signals to a demodulator resulting in demodulated digital electronic signals, wherein each of the demodulated signals includes a dynamic range digitally encoded in a fixed number of bits. In addition, the apparatus, method and system further involves selecting a portion of the fixed number of bits for each of the demodulated signals resulting in adjusted signals, and outputting the adjusted signals to a recorder.

BRIEF DESCRIPTION OF THE DRAWINGS

FIG. 2a shows the recorder connected to demodulators, wherein the recorder has an output depicting a portion of the dynamic range.

FIG. 2b shows the dynamic range digitalized into a fixed number of bits.

FIG. 3 is an overview of the system for seismic signal processing by optimizing bandwidth utilization of demodulators.

DESCRIPTION OF EXAMPLE EMBODIMENTS FOR THE INVENTION

Figure 1:
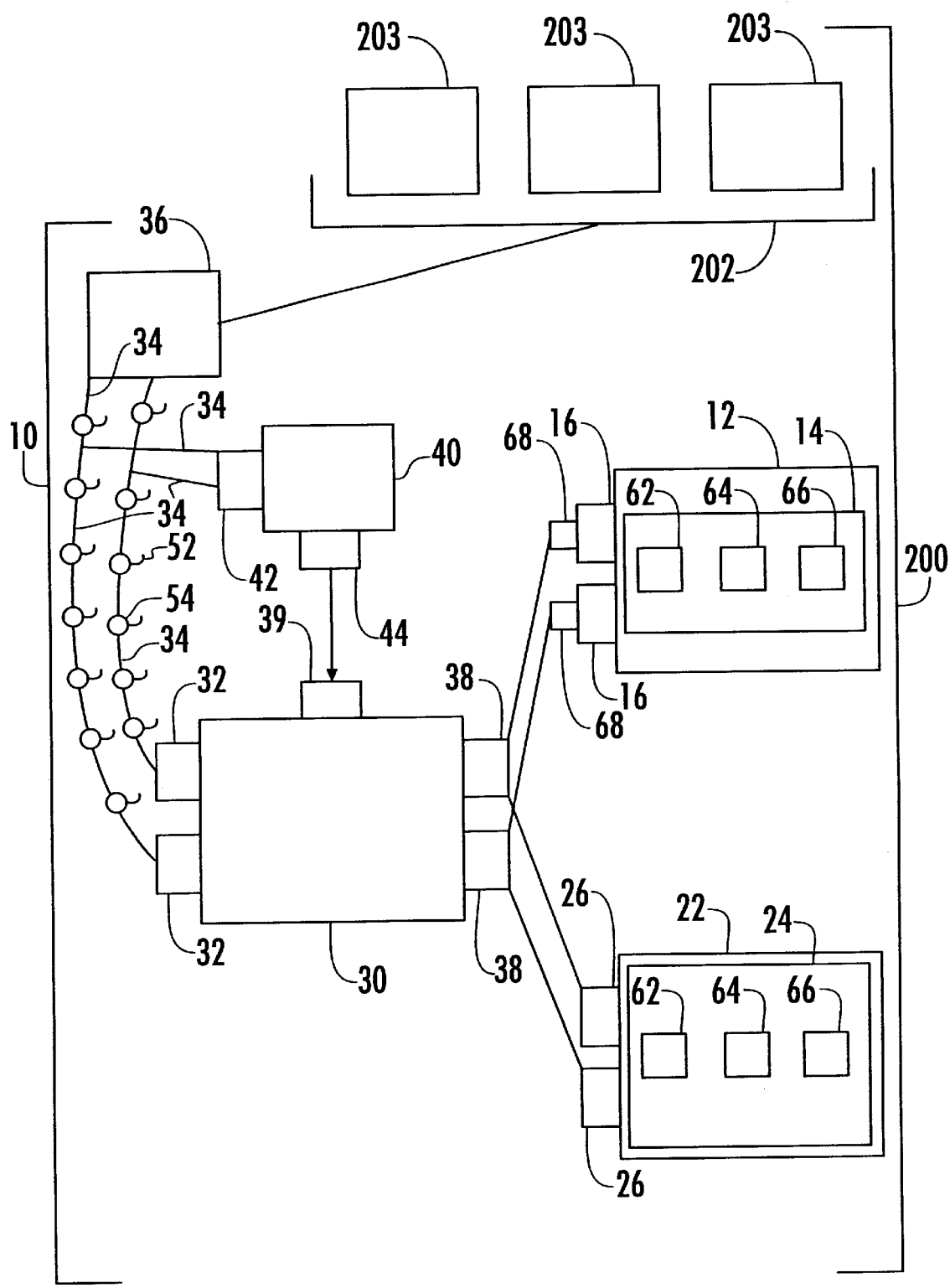
FIG. 1 is an overview of the apparatus for optimizing bandwidth utilization of demodulators in a system for seismic signal processing.

Seen in FIG. 1 is an apparatus (10) for optimizing bandwidth utilization of demodulators in a system (200) for seismic signal processing. The apparatus (10) comprises a first demodulator (12) having a first bandwidth (14) and first optical demodulator inputs (16), and a second demodulator (22) having second optical demodulator inputs (26) and a second bandwidth (24), wherein the second bandwidth (24) is greater than the first bandwidth (14). The apparatus further comprises an optical switch (30) having optical inputs (32) coupled to optical fibers (34) from seismic telemetry (36), optical outputs (38) coupled to the first optical demodulator inputs (16) and the second optical demodulator inputs (26), and a switch control input (39) electronically coupled to a fringe rate detector output (44). Still further, the apparatus (10) comprises a fringe rate detector (40) having a fringe rate detector input (42) coupled to the optical fibers (34) from seismic telemetry (36) and a fringe rate detector output (44) coupled to the switch control input (39). The optical fibers (34) bear optical signals (54) having fringe rates (52), whereby optical signals (54) are switched among the demodulators (12, 22) in dependence upon the fringe rates (52). A further example embodiment of the invention is the apparatus (10) previously described, wherein the system (200) comprises an array (202) of seismic sensors (203) coupled to seismic telemetry (36).

Still other example embodiments of the invention include the internal workings of the first demodulator (12) comprising a sampler (62), an analog to digital converter (64), and a demodulator board (66). Similarly, further example embodiments of the apparatus (10) include the internal workings of the second demodulator (22) comprising a sampler (62), an analog to digital converter (64), and a demodulator board (66). The demodulators (12, 22) and variations on the internal workings of the demodulators (12, 22) will occur to those of skill in the art without departing from the scope of the present invention.

Another example embodiment of the invention is the apparatus (10) previously described, wherein the second demodulator (22) has a capability for processing higher fringe rates (52) than processable by the first demodulator (12). That is, in another example embodiment of the invention, the first demodulator (12) comprises a fringe rate threshold input (68). The fringe rate threshold input (68) of the first demodulator (12) is the maximum fringe rate (52) that the first demodulator (12) can receive and process. The limiting factor setting the number of channels in a demodulator (12, 22) is the fringe rate (52) of the interferometer. For example, using a typical sensor, high bandwidth signals (e.g., direct arrival from an airgun) can create a fringe rate (52) greater than 100 kHz, wherein the current processor technology would allow approximately eight channels per board to be processed. With lower bandwidth signals, i.e., lower fringe rates (52) such as ~10 kHz, the channels per board can be pushed up significantly past eight channels per board. To increase the number of channels per board then, when the fringe rate (52) exceeds the fringe rate threshold input (68) of the first demodulator (12), according to yet another example embodiment of the invention, the apparatus (10) reroutes these higher fringe rate (52) signals (54) to the second demodulator (22). Still a further example embodiment of the invention is the apparatus (10) having fringe rates (52) now falling below the fringe rate threshold input (68) of the first demodulator (12), so the signals (54) having fringe rates (52) below the fringe rate threshold input (68) are rerouted from the second demodulator (22) back to the first demodulator (12).

Various non-limiting examples of the present invention, therefore, provide an apparatus (10), as well as a method and a system (100) that dynamically sense and reroute signals (54) to different demodulators (12, 22) based on fringe rates (52) in order to optimize bandwidth utilization of demodulators (12, 22).

Turning now to FIG. 2a, another example embodiment of the invention is the apparatus (10) further comprising a recorder (70) coupled to both the first demodulator (12) and the second demodulator (22). In still another example embodiment of the invention, the demodulators (12, 22) have greater resolution capabilities than the recorder (70). The apparatus (10) further comprising a recorder output (76) depicting a portion (78) of a dynamic range (80), wherein, as seen in FIG. 2b, the dynamic range (80) is digitally encoded in a fixed number of bits (82).

Referring now to FIG. 3, further example embodiments of the invention are depicted, wherein a system (100) for seismic signal processing by optimizing bandwidth utilization of demodulators (12, 22) is disclosed. The system (100) comprises a means (102) for routing optical signals (54) to a first demodulator (12), a means (104) for sensing a fringe rate (52) for each of the optical signals (54), and a means (106) for detecting a signal line (55) having fringe rates (52) exceeding a threshold fringe rate input (68) for the first demodulator (12). The system (100) further comprises a means (108) for rerouting the signal line (55) to a second demodulator (22), a means (110) for detecting a fringe rate condition (57) of the signal line (55), and a means (108) for rerouting the signal line (55) from the second demodulator (22) back to the first demodulator (12) when the signal line (55) has fringe rates (52) below the threshold fringe rate input (68) for the first demodulator (12). Further, more example embodiments of the invention include the system (100) just described further comprising seismic telemetry (36) coupled to the means (102) for routing and seismic telemetry (36) coupled to the means (104) for sensing.

Figure 4:
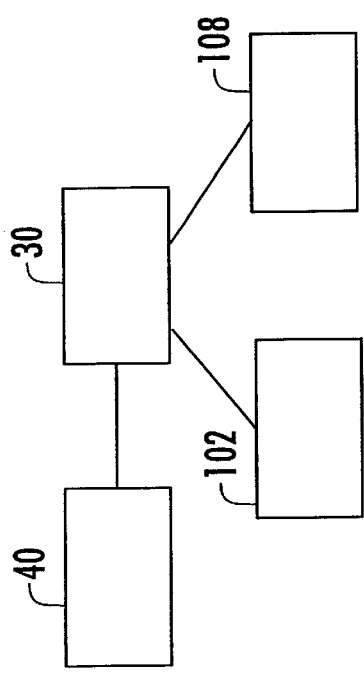
FIG. 4 shows a fringe rate detector and an optical switch used to route and reroute optical signals

Turning now to FIG. 4, in more example embodiments of the invention, the means (102) for routing and the means (108) for rerouting comprise an optical switch (30) in the system (100) previously described. Examples of optical switches acceptable in the present example will occur to those of skill in the art.

In still another example embodiment of the invention, the system comprises a means (104) for sensing a fringe rate (52) for each of the optical signals (54) being received, wherein the means (104) for sensing comprises a fringe rate detector (40). Acceptable fringe rate detectors (40) will occur to those of skill in the art.

In still another example embodiment of the invention, the system (100) comprises a means (106) for detecting a signal line (55), wherein the means (106) for detecting comprises comparing the fringe rate (52) for each optical signal (54) to a threshold fringe rate input (68) for the first demodulator (12). If the fringe rate (52) falls below the threshold fringe rate input (68) for the first demodulator (12), then the first demodulator (12) processes the signal (54). If the fringe rate (52) does not fall below the threshold fringe rate input (68) for the first demodulator (12), then the system (100) uses the means (108) for rerouting the signal (54) from first demodulator (12) to the second demodulator (22).

Returning to FIG. 3, other example embodiments of the invention is the system (100) previously described, wherein the internal workings of the first demodulator (12) comprise a sampler (62), an analog to digital converter (64), and a demodulator board (66). Similarly, another example embodiment of the apparatus (10) is the second demodulator (22) comprising a sampler (62), an analog to digital converter (64), and a demodulator board (66). In addition, the demodulators (12, 22) used in various examples of the present invention are not necessarily identical. In still another example embodiment of the invention, the second demodulator (22) of the system (100) previously described has a capability for processing higher fringe rates (52) than processable by the first demodulator (12). Consequently, as described herein, the system (100) employs the means (108) to reroute the higher fringe rates (52) to the second demodulator (22) for processing.

Figure 5:
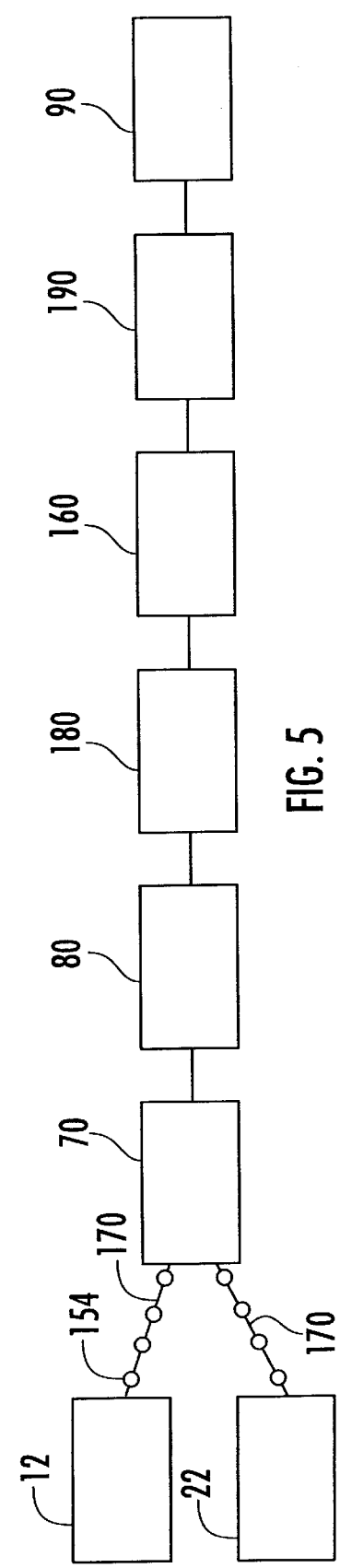
FIG. 5 shows the system having a recorder connected to demodulators, wherein the recorder has a means for outputting a portion of the dynamic range, and thereby, showing the active gain ranged signals.

Turning now to FIG. 5, yet another example embodiment of the invention is the system (100) further comprising a means (170) for sending demodulated optical signals (154) to a recorder (70), wherein the recorder (70) is coupled to both the first demodulator (12) and the second demodulator (22). The means (170) for sending demodulated optical signals is in various example embodiments, through computers, cabling, and wires.

According to still another example embodiment of the invention, the demodulators (12, 22) have greater resolution capabilities than the recorder (70). For example, state 32-bit demodulators are used in conjunction with data output buses used to log the information from the arrays on to recorders having 20 to 24 bits of dynamic range. Therefore, the 32-bit output of the demodulators is actively adjusted so that the most useful bits are output. With this "gain ranging" principle in mind, according to still another example embodiment of the invention, the system (100) further comprises a means (180) for selecting a portion (160) of a dynamic range (80), wherein the dynamic range (80) is digitally encoded in a fixed number of bits (82), thereby producing the active gain ranged signals (90). An example means (180) for selecting is a user or computer controlled knob permitting active ranging in order to increase low bandwidth signals and decrease high bandwidth signals, thereby allowing the user to increase the resolution of the signals output to the recorder (70). In still a further example embodiment of the invention, the system (100) farther comprises a means (190) for outputting the active gain ranged signals (90). Example means (190) for outputting the active gain ranged signals (90) comprise a printer or computer storage medium.

The various means described in reference to the later Figures will be understood and will occur to those of ordinary skill in the art from a review of the earlier disclosure, and the specific examples of the various drawings.

Having thus described exemplary embodiments of the invention, it will be apparent that various alterations, modifications and improvements will readily occur to those skilled in the art. Such obvious alterations, modifications and improvements, though not expressly described above, are nevertheless intended to be implied and are within the spirit and scope of the invention. Accordingly, the foregoing discussion is intended to be illustrative only, and not limiting; the invention is limited and defined by the following claims and equivalents thereto.

What is claimed is:

1. An apparatus for optimizing bandwidth utilization of demodulators in a system for seismic signal processing, the apparatus comprising:
    a first demodulator comprising a first bandwidth and first optical demodulator inputs;
    a second demodulator comprising second optical demodulator inputs and a second bandwidth, wherein the second bandwidth is greater than the first bandwidth;
    an optical switch comprising:
        optical inputs coupled to optical fibers,
        optical outputs coupled to the first optical demodulator inputs and the second optical demodulator inputs, and
        a switch control input electronically coupled to a fringe rate detector output; and
    the fringe rate detector having a fringe rate detector input coupled to the optical fibers from seismic telemetry and a fringe rate detector output coupled to the switch control input;
    wherein the optical fibers bear optical signals having fringe rates;
    whereby the optical signals are switched among the demodulators in dependence upon the fringe rates.

2. The apparatus of claim 1, wherein the system comprises an array of seismic sensors coupled to seismic telemetry.

3. The apparatus of claim 1, wherein the first demodulator comprises a sampler.

4. The apparatus of claim 1, wherein the first demodulator comprises an analog to digital converter.

5. The apparatus of claim 1, wherein the first demodulator comprises a demodulator board.

6. The apparatus of claim 1, wherein the second demodulator comprises a sampler.

7. The apparatus of claim 1, wherein the second demodulator comprises an analog to digital converter.

8. The apparatus of claim 1, wherein the second demodulator comprises a demodulator board.

9. The apparatus of claim 1, wherein the second demodulator has a capability for processing higher fringe rates than processable by the first demodulator.

10. The apparatus of claim 1, wherein the first demodulator comprises a fringe rate threshold input.

11. The apparatus of claim 10, wherein fringe rates exceeding the fringe rate threshold input are rerouted to the second demodulator.

12. The apparatus of claim 11, wherein fringe rates falling below the fringe rate threshold input are rerouted back to the first demodulator.

13. The apparatus of claim 1, further comprising a recorder coupled to both the first demodulator and the second demodulator.

14. The apparatus of claim 13, wherein the demodulators have greater resolution capabilities than the recorder.

15. The apparatus of claim 13, further comprising a recorder output depicting a portion of a dynamic range, wherein the dynamic range is digitally encoded in a fixed number of bits.

16. A method of processing seismic signals, the method comprising:
    routing optical signals to a first demodulator;
    sensing fringe rates of the optical signals;
    detecting fringe rates exceeding a threshold fringe rate of the first demodulator;
    rerouting optical signals having fringe rates exceeding the threshold fringe rate of the first demodulator to a second demodulator;
    detecting fringe rates falling below the threshold fringe rate of the first demodulator; and
    rerouting optical signals having fringe rates falling below the threshold fringe rate of the first demodulator from the second demodulator back to the first demodulator.

17. The method of claim 16, wherein the method further comprises coupling the optical signals to seismic telemetry.

18. The method of claim 16, wherein said routing comprises routing through an optical switch.

19. The method of claim 16, wherein said sensing comprises sensing through a fringe rate detector.

20. The method of claim 16, wherein said rerouting comprises rerouting through an optical switch.

21. The method of claim 16, wherein the method further comprises sending demodulated optical signals from the demodulators to a recorder.

22. The method of claim 21, wherein the method further comprises resolving demodulated optical signals sent to a recorder.

23. The method of claim 22, wherein said resolving comprises selecting a portion of a dynamic range representing each of the demodulated optical signals sent to the recorder, wherein the portion selected results in active gain ranged signals.

24. The method of claim 23, wherein the method further comprises outputting the active gain ranged signals.

25. A system of processing seismic signals, the system comprising:

means for routing optical signals to a first demodulator;

means for sensing fringe rates of the optical signals;

means for detecting fringe rates exceeding a threshold fringe rate of the first demodulator;

means for rerouting optical signals having fringe rates exceeding the threshold fringe rate of the first demodulator to a second demodulator;

means for detecting fringe rates falling below the threshold fringe rate of the first demodulator; and means for rerouting optical signals having fringe rates falling below the threshold fringe rate of the first demodulator from the second demodulator back to the first demodulator.

26. The system of claim 25, wherein the system further comprises means for coupling the optical signals to seismic telemetry.

27. The system of claim 25, wherein said means for routing comprises an optical switch.

28. The system of claim 25, wherein said means for sensing comprises a fringe rate detector.

29. The system of claim 25, wherein said means for rerouting comprises an optical switch.

30. The system of claim 25, wherein said means for detecting a signal line comprises means for comparing the fringe rate for each optical signal to a threshold fringe rate input of the first demodulator.

31. The system of claim 25, wherein the first demodulator comprises a sampler.

32. The system of claim 25, wherein the first demodulator comprises an analog to digital converter.

33. The system of claim 25, wherein the first demodulator comprises a demodulator board.

34. The system of claim 25, wherein the second demodulator comprises a sampler.

35. The system of claim 25, wherein the second demodulator comprises an analog to digital converter.

36. The system of claim 25, wherein the second demodulator comprises a demodulator board.

37. The system of claim 25, wherein the second demodulator has a capability for processing higher fringe rates than processable by the first demodulator.

38. The system of claim 25, wherein the system further comprises means for sending demodulated optical signals from the demodulators to a recorder.

39. The system of claim 38, wherein the system further comprises means for resolving demodulated optical signals sent to a recorder.

40. The system of claim 39, wherein said means for resolving comprises means for selecting a portion of a dynamic range representing each of the demodulated optical signals sent to the recorder, wherein the portion selected results in active gain ranged signals.

41. The system of claim 40, wherein the system further comprises outputting the active gain ranged signals.

* * * * *